United States Patent [19]
Fitz, III et al.

[11] Patent Number: 5,115,112
[45] Date of Patent: May 19, 1992

[54] SPARK EROSION MACHINING DEVICE AND METHOD FOR CORRECTING FOR THE WEAR OF A MACHINING ELECTRODE

[75] Inventors: George E. Fitz, III; Rudi O. Krenz; Harmon R. Carnes, all of Albuquerque, N. Mex.

[73] Assignee: General Electric Company, Cincinnati, Ohio

[21] Appl. No.: 660,086

[22] Filed: Feb. 25, 1991

[51] Int. Cl.⁵ .................. B23H 7/12; B23H 9/10
[52] U.S. Cl. .................. 219/69.2; 219/69.17
[58] Field of Search ............ 219/69.1, 69.11, 69.16, 219/69.2, 69.17, 69.13; 204/129.25, 224 M; 409/187, 194

[56] References Cited

U.S. PATENT DOCUMENTS

| | | | |
|---|---|---|---|
| 2,059,236 | 11/1936 | Holslag | 219/69.17 |
| 2,818,491 | 12/1957 | Matulaitis | 219/69.16 |
| 3,688,074 | 8/1972 | Stirner et al. | 219/69.16 |
| 3,778,579 | 12/1973 | Takarada | 219/69.19 |
| 3,816,692 | 6/1974 | Ratmansky | 219/69.19 |
| 4,039,779 | 8/1977 | Rupert | 219/69.16 |
| 4,045,641 | 8/1977 | Ullmann et al. | 219/69.17 |
| 4,345,131 | 8/1982 | Semon et al. | 219/69.16 |
| 4,948,933 | 8/1990 | Thompson | 219/69.2 |

*Primary Examiner*—Geoffrey S. Evans
*Attorney, Agent, or Firm*—Charles L. Moore, Jr.; Jerome C. Squillaro

[57] ABSTRACT

A device for machining a cylindrically shaped gas turbine engine component includes a computer numerical controlled lathe and a wheel-shaped electrode for spark erosion machining of the component. The lathe includes a faceplate for mounting and rotating the component, and a gage surface is concentrically mounted relative to the component on the faceplate for in-process determination of a largest gaged radius of the wheel-shaped electrode. The radius is determined by the computer numerical control when an electronic current sensing circuit signals the computer numerical control that the electrode has contacted the gage surface. The electrode can then be positioned relative to the component, to correct for erosion of material from the electrode caused by the previous machining cycle, before a subsequent machining cycle.

16 Claims, 3 Drawing Sheets

SPARK EROSION MACHINING DEVICE AND METHOD FOR CORRECTING FOR THE WEAR OF A MACHINING ELECTRODE

BACKGROUND OF THE INVENTION

The present invention relates to spark erosion machining, and more particularly, to a novel device for machining a gas turbine engine component, such as a low pressure turbine (LPT) shroud or the like, and a novel method for automatically correcting for the continuous wear or erosion of the wheel-shaped electrode of a Spark Erosion Machining (SEM) device during a machining operation.

A SEM device may typically include a computer numerical controlled (CNC) lathe having a faceplate type fixture mounted to a lathe spindle to hold a cylindrically shaped gas turbine engine component or the like for rotation about a cylindrical axis of the component during machining. The spark erosion machining is performed by a rotating metallic wheel-shaped, or disk-shaped, electrode. The wheel-shaped electrode is connected to one terminal of an alternating current power supply, and the oppositely polarized terminal of the power supply is connected to the component or workpiece by a brush contact which rides on an axis of the lathe spindle of the SEM device. Depending upon the A.C. voltage applied between the component and the wheel-shaped electrode, when the electrode is brought within a certain distance from the component to be machined, an electrical arc will jump between the electrode and the oppositely polarized component being machined. This arc or spark will cause a portion of the material of the component to be removed or vaporized. During removal of metal from the component part, material is also eroded from the wheel-shaped electrode; thus, the size of the electrode continually decreases during the machining operation.

Several machining passes or cycles may typically be required to machine or mill a component part, such as an LPT shroud or the like, to design specifications. Unless the dimension of the SEM wheel-shaped electrode is measured before each cycle and the SEM device is adjusted to correct for the variation in electrode size, the component may not be precisely machined to the specified dimension. Many components measured after machining have been found to have more material removed than required by design specifications or not enough material was removed.

To consistently machine an LPT shroud, having an interior portion formed of a multiplicity of honeycomb-shaped structures, to specified dimensions, it is necessary for a machine operator to measure the largest distance or radius between the rotational axis of the wheel-shaped electrode and the outer peripheral edge of the electrode before each machining pass or cycle. The electrode may not wear evenly about its circumference and therefore care should be taken to determine the largest radius each time. The operator will then make adjustments to the SEM device in order to take the proper depth of cut during each successive machining cycle in order to obtain a shroud with the specified dimensions.

This method may reduce many machining errors, depending upon the skill of the operator, but the time to completely machine an LPT shroud is substantially increased. Machining errors may still occur if an operator incorrectly measures the largest radius of the wheel-shaped SEM electrode or incorrectly inputs a correctly measured radius into the computer numerical control (CNC) of the SEM device.

SUMMARY OF THE INVENTION

It is accordingly a primary object of the present invention to provide a novel device and method for machining a gas turbine engine component or the like which is not subject to the foregoing disadvantages.

It is another object of the present invention to provide a device and method for automatically correcting for the continuous wear of a wheel-shaped electrode of a SEM device, which does not require the interaction of a machine operator.

In accordance with the invention, a device for machining a gas turbine engine component, such as the interior portion of a cylindrically shaped shroud, formed of a multiplicity of honeycomb-shaped structures or the like, includes means for mounting the component or honeycombed shroud and for rotating the shroud at a chosen speed and direction about a cylindrical axis of the component. The mounting and rotating means may be a computer numerical controlled (CNC) lathe or the like with a faceplate or mounting fixture mounted to the lathe spindle to hold and rotate the component during machining. The device further includes a wheel-shaped electrode for spark erosion machining of the component.

A cylindrically shaped gage surface is concentrically mounted relative to the component on the mounting means or faceplate of the CNC lathe for in process determination of the largest radius of the wheel-shaped electrode to dimensionally control the machining of the component. A drive motor is connected to the wheel-shaped electrode for rotating the electrode about its center axis at a selected speed and direction relative to the chosen speed and direction of rotation of the component. An A.C. power supply is connected between the electrode and the component to cause an arc or spark to jump across a narrow gap between the wheel-shaped electrode and the component when the electrode is positioned in close proximity to the component. This arcing will cause removal of material from the component or honeycombed structures of the shroud as the component and electrode are rotated at their respective speeds and direction. Preferably, the component and electrode are rotated in opposite directions relative to one another.

A first electrical circuit is defined by the power supply, the wheel-shaped electrode, the component and the mounting and rotating means when the wheel-shaped electrode is in a first position for machining the shroud, and a second electrical circuit is defined by the power supply, the wheel-shaped electrode, the gage surface and the mounting and rotating means when the wheel-shaped electrode is in a second position in momentary contact with the gage surface. The device further includes at least two axes of motion for moving the wheel-shaped electrode between the first and second positions.

A sensing means senses an A.C. current alternatively through either the first or second electrical circuits depending upon the position of the wheel-shaped electrode. A current sense electronic circuit generates an electrical signal in response to a sensed A.C. current level in the first electrical circuit after a component machining operation or cycle. This generated signal is received by a probe input section of the CNC and the CNC causes movement of the electrode from its first position to the second position where the electrode momentarily contacts the gage surface. The CNC senses contact between the electrode and the gage surface and determines a largest gaged radius for the wheel-shaped electrode from this momentary contact and using a known coordinate position of the gage surface. The CNC then causes repositioning of the wheel-shaped electrode, relative to the component, in response to the determined electrode radius for another shroud machining operation.

In accordance with the invention, a method for automatically correcting (without operator intervention) for the continuous wear of a wheel-shaped electrode of a SEM device during machining of a gas turbine engine component such as a honeycombed interior portion of a shroud or the like includes the steps of: (a) mounting the component on a rotatable faceplate mounting fixture of the machining device for rotation of the component about a cylindrical axis; (b) concentrically mounting a gage surface relative to the component on a rotatable faceplate of the machining device; (c) moving the wheel-shaped electrode into momentary contact with the gage surface; (d) storing a rotational axis coordinate position of the wheel-shaped electrode when the electrode contacts the gage surface; (e) calculating a new largest electrode radius from the stored rotational axis coordinate position of the electrode and from the known position of the gage surface; (f) repositioning the electrode relative to the component, in response to the new calculated electrode radius, for a next spark erosion machining cycle; and (g) repeating steps (c)–(f) until a desired component dimension is achieved.

These and other objects of the invention, together with features and advantages thereof will become apparent from the following detailed specification when read with the accompanying drawings in which like referenced numerals refer to like elements.

DETAILED DESCRIPTION OF THE PREFERRED EMBODIMENTS

Figure 1:
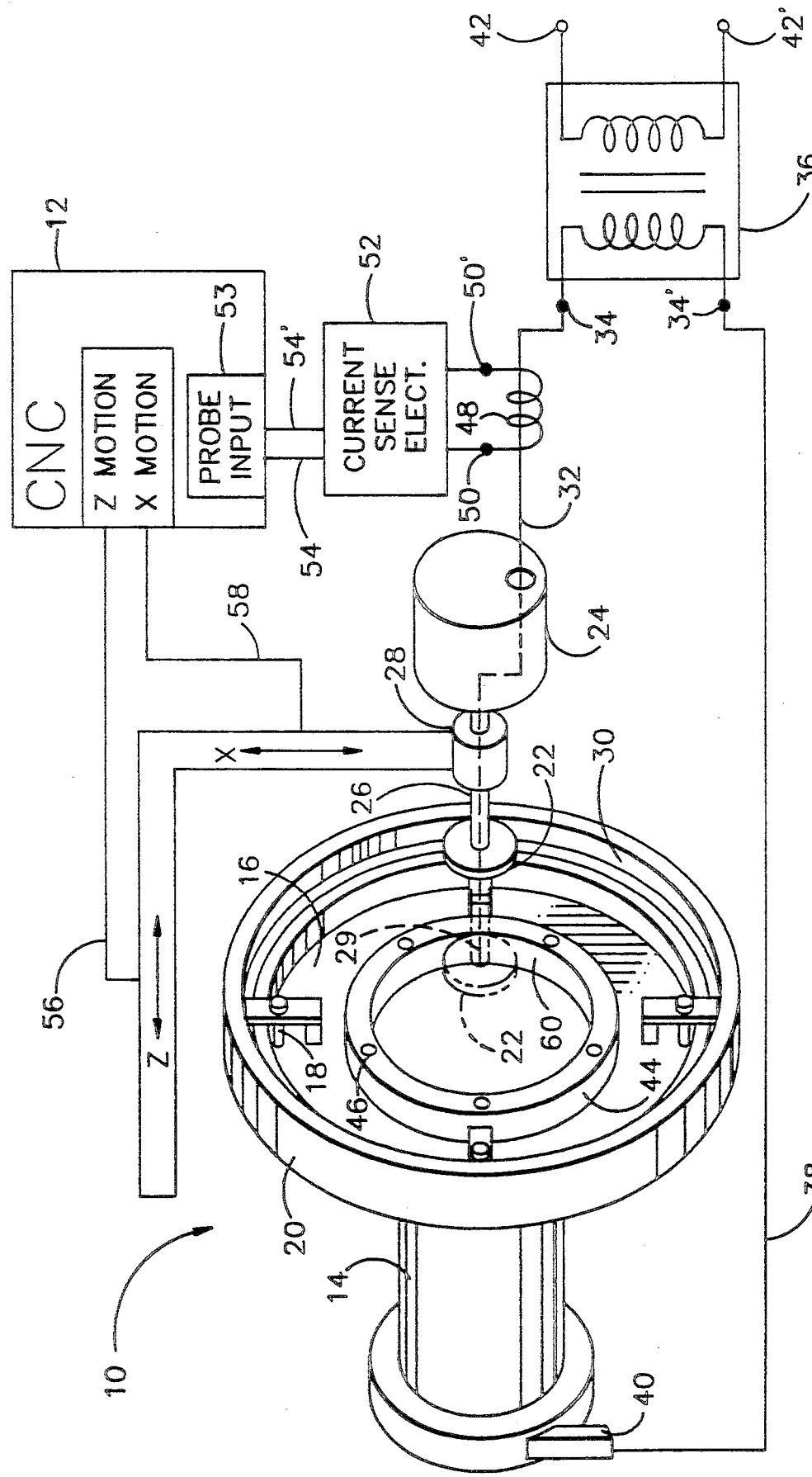
FIG. 1 is a perspective view of the spark erosion machining device in accordance with the present invention.

FIG. 1 is a perspective view of a SEM device 10; some components of device 10 are shown in block diagram form for purposes of clarity and explanation. Device 10 includes a computer numerical controlled (CNC) lathe with a CNC controller 12 and a lathe spindle 14. A fixture or faceplate 16 is mounted at one end of spindle 14 and includes clamping means 18 for securing a workpiece 20, such as a LPT shroud or the like, for machining. Device 10 further includes a wheel-shaped electrode 22 for spark erosion machining of workpiece 20. Electrode 22 is a soft metal, such as a soft steel, copper or the like. A drive motor 24 is connected to wheel-shaped electrode 22 by a drive shaft 26, such as a Setco/Klock Model No. AC200 or the like. Electrode 22, drive motor 24 and drive shaft 26 are held in position by a tool holder 28 which is connected to at least two axes of motion, as indicated by the X and Z axes in FIG. 1. Tool holder 28, the X and Z axes of motion and their respective drive mechanisms are known elements of a CNC lathe, such as a Warner and Swasey Model No. WSC18. The coordinate positioning of tool holder 28 and a rotational coordinate axis 29 of electrode 22 are controlled by CNC controller 12 which controls motion along the X and Z axes. Tool holder 28 and X and Z axes permit repositioning of electrode 22 by CNC controller 12 to control the depth of the machining cut during each machining cycle of a honeycombed shroud or similar workpiece 20 and also permit automatic in-process measurement, i.e., measurement before each subsequent machining cycle, of the highest point or radius on wheel-shaped electrode 22 for dimensional control of the machining or depth of cut of an interior portion 30 of a workpiece 20 to correct for wear of electrode 22 during the previous machining cycle.

Wheel-shaped electrode 22 is connected by a conductor 32 or power lead to one terminal 34 of a high-current, low-voltage transformer or A.C. power supply 36. An oppositely polarized terminal 34' of power supply 36 is interconnected to workpiece 20 by a conductor 38 and a brush contact 40 which rides on lathe spindle 14. Power supply 36 is connectable to incoming line power by terminals 42 and 42'. A first electrical circuit is formed by power supply 36, conductor 32, wheel-shaped electrode 22, workpiece 20, faceplate 16, lathe spindle 14, brush contact 40 and conductor 38. Power supply 36 may be a 40 volt source which causes about 50 to about 100 amps to flow through this first electrical circuit during machining of workpiece 20.

In accordance with the present invention, a cylindrically shaped gage surface 44 is concentrically mounted relative to workpiece 20 on faceplate 16 of device 10 for in-process determination of the largest radius of wheel-shaped electrode 22 to dimensionally control the machining of workpiece 20. Gage surface 44 may be a metallic ring which is attached to faceplate 16 by fasteners 46, such as hex head bolts or the like.

While gage surface 44 is shown mounted within the boundary of workpiece 20 in FIG. 1, in machining some components, a larger diameter gage surface may have to be mounted outside the boundary of the component.

A current transformer 48 is magnetically coupled to conductor 32 for sensing the A.C. current flowing in conductor 32. Current transformer 48 is connected by terminals 50 and 50' to a current sense electronic circuit 52. Current sense electronic circuit 52 is in turn electrically connected to a probe input of CNC controller 12 by conductors 54 and 54'.

In operation, workpiece 20 is rotated at a speed of about 100 to about 140 r.p.m. in one direction and wheel-shaped electrode 22 is typically rotated in an opposite direction relative to workpiece 20 at a speed of about 3,000 r.p.m. to about 4,000 r.p.m. during a machining cycle. After electrode 22 has completed a machining cycle, the CNC controller 12 program will generate signals transmitted along signal paths 56 and 58 to cause X and Z axes of motion to wheel-shaped electrode 22 from a machining position proximate to workpiece 20, to a second position, in momentary contact with an interior portion 60 of gage surface 44. Electrode 22 could contact the exterior portion of gage surface 44 rather than interior portion 60 if sufficient clearance exists between workpiece 20 and gage surface 44. CNC controller 12 is conditioned, after a machining cycle, to bring rotating wheel-shaped electrode 22 in close proximity to gage surface 44 to cause only the highest peripheral point on electrode 22 to momentarily contact the interior of gage surface 44.

A second electrical circuit will be formed by power supply 36, conductor 32, electrode 22, gage surface 44, faceplate 16, lathe spindle 14, brush 40 and conductor 38 when electrode 22 momentarily contacts gage surface 44. Current transformer 48 and current sense circuit 52 will detect a selected current level when electrode 22 contacts gage surface 44 and circuit 52 will transmit a signal to CNC controller 12. The signal will cause CNC controller 12 to store the coordinate position of the X axis and the Z axis of wheel-shaped electrode 22 when the electrode contacts the gage surface. CNC controller 12 will then calculate a new largest electrode radius from the stored X and Z axes coordinate postions of electrode 22 and from a known coordinate position of gage surface 44 which is also stored by CNC controller 12. Electrode 22 is then repositioned relative to workpiece 20 to correct for wearer erosion of electrode 22 caused during the previous machining cycle before a subsequent spark erosion machining operation. Electrode 22 is positioned to take the proper depth of cut in workpiece 20 during this next machining operation in response to the newly calculated electrode radius. After completing this next machining cycle, electrode 22 may again be moved into contact with gage surface 44 to calculate another new largest electrode radius and to correct for wear or erosion of electrode 22 caused by the prior machining cycle before a subsequent machining cycle. These steps may be repeated until workpiece 20 is machined to desired specifications.

Those skilled in the art will recognize the improved efficiency of the present invention. Most machining errors, particularly operator errors, are eliminated, and because the electrode wear is corrected in-process, automatically, without operator interaction, a substantial reduction in the time to machine a gas turbine engine component such as a LPT shroud may be realized.

Figure 2:
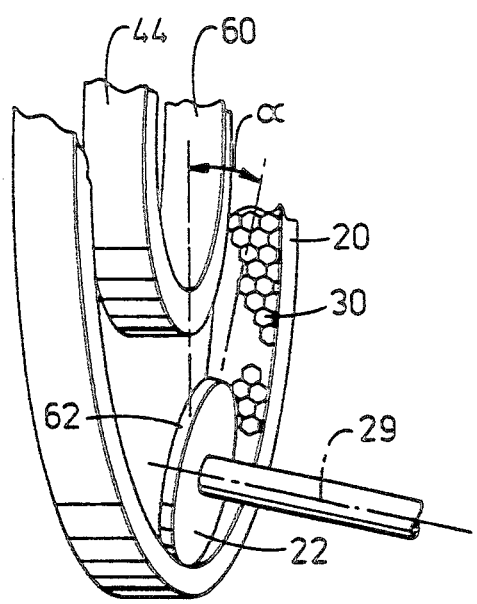
FIG. 2 is a detailed view of a portion of the spark erosion machining device of FIG. 1.

It should be noted that spark erosion machining may only be used to machine components which have a discontinuous surface to be machined, such as the honeycombed structural surface of the interior of a LPT shroud as shown in FIG. 2.

Referring to FIG. 2, the plane of rotation of electrode 22 preferably intersects the discontinuous surface being machined at a selected angle alpha, preferably about 5 to about 15 degrees relative to the surface normal of the surface being machined. Machining at angle alpha causes only an edge 62 of electrode 22 to come into contact with interior surface 60. This procedure prevents damage or burring of the honeycombed structure.

Figure 3:
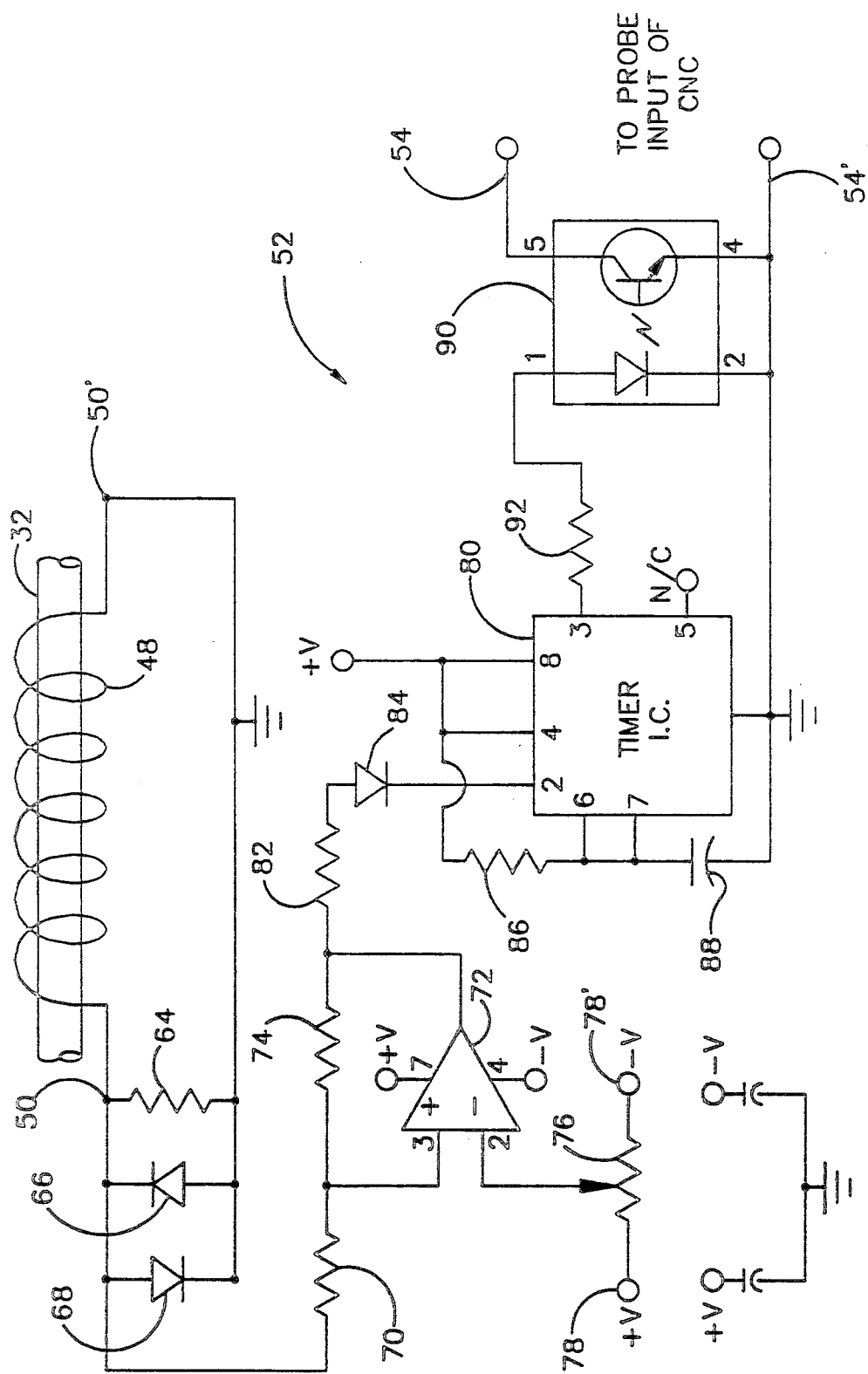
FIG. 3 is an electrical schematic diagram of the current sensing circuit in accordance with the present invention.

FIG. 3 is a schematic diagram of current transformer 38 and current sense electronic circuit 52 which senses the flow of low level alternating current through conductor 32. When an alternating current of about ⅓ amp RMS is sensed by circuit 52, the circuit will generate a monostable output pulse of a selected voltage level and a selected pulse width to signal CNC controller 12 that a gaging cycle has been completed for determination of a new largest electrode radius before a subsequent machining operation. The circuit 52 output pulse generated after a machining cycle and during electrode radius measurements is preferably about 12 volts and 10 milliseconds in width. This pulse is required by CNC controller 12 to detect contact between electrode 22 and gage surface 44. Circuit 52 should sense a low level current flow in conductor 32 to prevent gage surface 44 from being eroded during electrode radius measurements, and circuit 52 must also ignore high current flow through conductor 32 during machining of workpiece 20.

Terminal 50' of current transformer 48 is connected to ground potential and one side of resistor 64. Terminal 50 of current transformer 48 is connected to the signal side of resistor 64. Resistor 64 is preferably about 10 ohms and converts the current sensed by transformer 48 to a voltage. A pair of diodes 66 and 68 are connected in parallel across resistor 64 and in opposite polarity to one another to limit the voltage across resistor 64 during a high current flow condition in conductor 32 which will occur during an actual machining operation of workpiece 20.

Terminal 50 of transformer 48 is also connected by a resistor 70 to a noninverting input of an operational amplifier 72. Operational amplifier 72 may be a 748 operational amplifier as manufactured by the National Semiconductor Corporation. A feedback resistor 74 is connected between the output and noninverting input of op amp 72. If a 748 op amp is used, op amp 72 is preferably biased by about −12 volts and +12 volts at respective op amp contacts 4 and 7. A potentiometer 76 is connected to the inverting input of op amp 72. Potentiometer 76 has electrodes 78 and 78' and equal potentials of opposite polarity, preferably about +12 and −12 volts, are respectively connected to electrodes 78 and 78'. In this configuration, op amp 72 will function as a comparator with hysteresis to switch the op amp output between about +12 volts, when the current through conductor 32 is high and a machining operation is being performed, and about −12 volts, when a current of about ⅓ amp RMS or less is sensed flowing in conductor 32 during an electrode radius measurement and after a machining cycle.

The output of operational amplifier 72 is connected to a gate contact 2 of a timer integrated circuit (I.C.) 80, such as an NE555 timer integrated circuit as manufactured by the Signetics Corporation. Operational amplifier 72 is connected to timer I.C. 80 by the series combination of a resistor 82 and a diode 84. A positive potential relative to ground is connected directly to contacts 4 and 8 of the NE555 timer and the positive potential is connected by a resistor 86 to timer contacts 6 and 7. Timer contact 1 is connected to ground potential and is also interconnected to timer contact 7 by a capacitor 88. Timer output contact 3 is connected to an opto-isolator 90 by a resistor 92. Opto-isolator 90 may be a TIL 157 opto-isolator as manufactured by Texas Instruments, Inc. Opto-isolator 90 prevents direct electrical contact between current sense electronic circuit 52 and the probe input of CNC controller 12 but will optically transfer a voltage pulse to CNC controller 12.

In operation, during a machining cycle, a high current of about 10 amps to about 150 amps will be sensed by current transformer 48 and the output of operational amplifier 72 will be high or about +12 volts, if 12 volts is the biasing voltage selected for operational amplifier 72. After a machining cycle, when electrode 22 is no longer in contact with workpiece 20, little or no current flow will be detected by transformer 48 in conductor 32 and the output of operational amplifier 72 will switch to +12 volts. The +12 volt operational amplifier output will switch to −12 volts when current flows in conductor 32 which will trigger timer I.C. 80 to output a monostable pulse having an amplitude of 12 volts for 10 milliseconds. This pulse is optically transferred to CNC controller 12 to enable the CNC to detect contact between electrode 22 and gage surface 44 and to determine a new largest electrode radius.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention is described herein in detail in relation to its preferred embodiments, it is to be understood that this disclosure is only illustrative and exemplary of the present invention and is made merely for purposes of providing a full and enabling disclosure of the invention. Accordingly, it is intended that the invention is limited only by the spirit and scope of the claims appended hereto.

What is claimed is:

1. A device for machining a cylindrically shaped component, comprising:
    a computer numerical controlled lathe having a faceplate to mount the component and to rotate the component at a chosen speed and a chosen direction about a cylindrical axis of the component;
    a wheel-shaped electrode for spark erosion machining of the component;
    drive means for rotating said wheel-shaped electrode about a rotational axis at a selected speed and a selected direction relative to the chosen speed and direction of rotation of the component;
    means for generating an arc between said wheel-shaped electrode and the component when said electrode is in a machining position in close proximity to the component, said arc causing removal of a chosen quantity of material from the component and erosion of material from said wheel-shaped electrode; and
    means for automatically correcting for the erosion of material from the wheel-shaped electrode after a machining cycle to dimensionally control the quantity of material removed from the component in a subsequent machining operation.

2. The device of claim 1, wherein said correcting means comprises:
    a cylindrically shaped gage surface concentrically mounted relative to the component on said faceplate;
    means for sensing completion of a machining cycle;
    means for moving said wheel-shaped electrode from said machining position to a gaging position, in momentary contact with said gage surface, in response to sensing completion of a machining cycle;
    means for determining a largest gaged radius of said wheel-shaped electrode when said electrode momentarily contacts said gage surface; and
    means for repositioning said wheel-shaped electrode, relative to the component, in response to said determined gaged radius for a subsequent machining operation.

3. The device of claim 2, wherein said radius determining means comprises:
    means for storing a coordinate position of said wheel-shaped electrode when said electrode contacts said gage surface; and
    means for calculating said largest gaged radius from said coordinate position and from a known position of the gage surface.

4. The device of claim 3, wherein said storing means and said calculating means are a part of said computer numerical control for said lathe.

5. A device for machining a cylindrically shaped component, comprising:
    means for mounting the component and for rotating the component at a chosen speed and direction about a cylindrical axis of the component;
    a wheel-shaped electrode for spark erosion machining of the component;
    a cylindrically shaped gage surface concentrically mounted relative to the component on said mounting means for in process determination of a largest gaged radius of said wheel-shaped electrode to dimensionally control the machining of the component;
    drive means for rotating said wheel-shaped electrode about a center axis at a selected speed and direction relative to the chosen speed and direction of rotation of the component;
    means for generating an arc between said wheel-shaped electrode and the component when said electrode is in a first position in close proximity to the component to remove a chosen quantity of material from the component, said arc generating means also causing erosion of said wheel-shaped electrode;
    means for moving said wheel-shaped electrode between said first position and a second position with said wheel-shaped electrode in contact with said gage surface;
    means for sensing a current when said electrode is alternatively in said first and second positions;
    means for generating an electrical signal responsive to a sensed current when said electrode is in said first position after a component machining operation to cause said moving means to move said wheel-shaped electrode from said first position to said second position;
    means for determining the largest gaged radius of said wheel-shaped electrode when said electrode is momentarily in said second position; and
    means for repositioning said wheel-shaped electrode, relative to the component, in response to said determined gaged radius for another component machining operation.

6. The device of claim 5, wherein said mounting and rotating means is a lathe having a spindle with a faceplate mounting fixture attached at one end and at least two axes of motion for moving said wheel-shaped electrode between said first and second positions.

7. The device of claim 6, wherein said arc generating means comprises an A.C. power supply connectable between said wheel-shaped electrode and a brush contact means for contacting said lathe spindle.

8. The device of claim 6, wherein said radius determining means comprises:
    means for storing a rotational axis coordinate position of said wheel-shaped electrode when said electrode contacts said gage surface; and means for calculating said largest gaged radius from said rotational axis coordinate position and from a known position of the gage surface.

9. The device of claim 8, wherein said storing means and said calculating means are a part of a computer numerical control for said lathe.

10. The device of claim 9, wherein said current sensing means is a current transformer having a pair of terminals, one of said terminals being connected to ground potential.

11. The device of claim 10, wherein said electrical signal generating means comprises:
   a resistor connected between said current transformer terminals for converting the sensed current to a voltage;
   comparator means, connected to another terminal of said current transformer by a resistor, for generating a triggering signal when a selected current level is sensed by said current transformer; and
   a timer circuit connected to receive said triggering signal and to generate a voltage pulse having a selected amplitude and a selected pulse width to cause said computer numerical control to move said wheel-shaped electrode from said first position to said second position for determination of the largest gaged radius.

12. The device of claim 11, further comprising an opto-isolator connected between said timer circuit and said computer numerical control to electrically isolate said computer numerical control from said electrical signal generating means and to optically transfer the voltage pulse to the computer numerical control.

13. The device of claim 5 wherein the gage surface is mounted within a boundary of the component.

14. The device of claim 5 wherein the gage surface is mounted outside a boundary of the component.

15. A method for automatically correcting for the continuous wear of a wheel-shaped electrode of a spark erosion machining device during machining of a cylindrically shaped component, said method comprising the steps of:
   (a) mounting the component on a rotatable faceplate mounting fixture of the machining device for rotation of the component about a cylindrical axis;
   (b) concentrically mounting a gage surface relative to the component on the rotatable faceplate;
   (c) moving the wheel-shaped electrode into momentary contact with the gage surface;
   (d) storing a coordinate position of the wheel-shaped electrode when the electrode contacts the gage surface;
   (e) calculating a new largest electrode radius from the stored coordinate position of the electrode and from a known position of the gage surface;
   (f) repositioning the electrode relative to the component, in response to the new calculated electrode radius, for a next spark erosion machining cycle; and
   (g) repeating steps (c)–(f) until a desired component dimension is achieved.

16. The method of claim 15, further comprising the step of sensing a selected current level in a power feed conductor interconnected to the wheel-shaped electrode before step (d), the selected current level being responsive to the contact between the wheel-shaped electrode and the gage surface.

* * * * *